(12) United States Patent
Martin et al.

(10) Patent No.: US 12,534,310 B2
(45) Date of Patent: Jan. 27, 2026

(54) SAND MANAGEMENT SYSTEMS AND SYSTEMS AND METHODS TO OPERATE A SAND MANAGEMENT SYSTEM

(71) Applicant: Halliburton Energy Services, Inc., Houston, TX (US)

(72) Inventors: Adam Harold Martin, Carrollton, TX (US); Mark Mcgouldrick, Arbroath (GB); Syed I. Hasan, Carrollton, TX (US); Daniel Joshua Stark, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 177 days.

(21) Appl. No.: 18/375,979

(22) Filed: Oct. 2, 2023

(65) Prior Publication Data
US 2024/0425305 A1    Dec. 26, 2024

Related U.S. Application Data

(60) Provisional application No. 63/522,698, filed on Jun. 22, 2023.

(51) Int. Cl.
*B65G 53/66*    (2006.01)
*B65G 53/10*    (2006.01)

(52) U.S. Cl.
CPC ............. *B65G 53/66* (2013.01); *B65G 53/10* (2013.01); *B65G 2201/045* (2013.01); *B65G 2203/0258* (2013.01)

(58) Field of Classification Search
None
See application file for complete search history.

(56) References Cited

U.S. PATENT DOCUMENTS

| | | | |
|---|---|---|---|
| 4,291,721 A | 9/1981 | Gemignani | |
| RE31,572 E * | 5/1984 | Coulter | F24F 13/00 75/460 |
| 5,209,300 A | 5/1993 | Ayers | |
| 8,337,122 B2 * | 12/2012 | Schultz | B65G 53/66 406/137 |
| 8,945,399 B2 * | 2/2015 | Howard | B04C 5/181 209/733 |
| 10,717,594 B2 * | 7/2020 | Urakata | B65G 53/22 |
| 11,465,076 B2 * | 10/2022 | Pitcher | B01D 21/34 |
| 11,506,006 B2 * | 11/2022 | Lymberopoulos | E21B 34/08 |

(Continued)

FOREIGN PATENT DOCUMENTS

| | | | | |
|---|---|---|---|---|
| CN | 110040518 A * | 7/2019 | | B65G 53/06 |
| CN | 214306519 U * | 9/2021 | | |

*Primary Examiner* — Joseph A Dillon, Jr.
(74) *Attorney, Agent, or Firm* — Conley Rose, P.C.; Rodney B. Carroll

(57) ABSTRACT

The disclosed embodiments include sand management systems and systems and methods to operate a sand management system. A sand management system includes a first vessel having a first insert and a second vessel having a second insert. The sand management system also includes a fluid flow path that fluidly connects the first vessel to the second vessel. The sand management system further includes a plurality of actuating valves each configured to dynamically shift from an open position to a closed position and from the closed position to the open position to regulate fluid flow.

11 Claims, 10 Drawing Sheets

(56) References Cited

U.S. PATENT DOCUMENTS

| | | | |
|---|---|---|---|
| 11,781,414 B2* | 10/2023 | Sinker | B01D 21/00 |
| | | | 166/266 |
| 11,938,422 B2* | 3/2024 | Malone | B01D 21/2411 |
| 2015/0251108 A1* | 9/2015 | Hartley | B65G 53/60 |
| | | | 210/199 |
| 2017/0355534 A1* | 12/2017 | Hunt | G01F 1/86 |
| 2019/0031430 A1* | 1/2019 | Urakata | C10J 3/466 |
| 2021/0299595 A1 | 9/2021 | Malone et al. | |
| 2021/0363029 A1* | 11/2021 | Johns | B01D 21/302 |
| 2022/0307363 A1* | 9/2022 | Nagge | E21B 33/03 |
| 2022/0363493 A1* | 11/2022 | Bowlin | B65G 65/46 |
| 2024/0117706 A1* | 4/2024 | Sayers | E21B 34/025 |
| 2024/0424429 A1* | 12/2024 | Martin | B01D 21/0012 |

* cited by examiner

SAND MANAGEMENT SYSTEMS AND SYSTEMS AND METHODS TO OPERATE A SAND MANAGEMENT SYSTEM

BACKGROUND

The present disclosure relates generally to sand management systems and systems and methods to operate a sand management system.

When the vessel in a sand management system fills, the differential pressure between the upstream and downstream flows increases. If this differential pressure reaches about a critical threshold, the screen within the vessel may collapse, which in turn may lead to a job being halted. An operator may redirect flow from one vessel to another before reaching the critical threshold. However, redirecting flow from one vessel to another may take up to an hour and would expose the operators to high pressure, and other well fluids. Additionally, solids may not always fill the vessel at uniform rates; the rates may suddenly and unexpectedly increase when a solids slug comes to surface.

BRIEF DESCRIPTION OF THE DRAWINGS

Illustrative embodiments of the present disclosure are described in detail below with reference to the attached drawing figures, which are incorporated by reference herein, and wherein.

Figure 1:
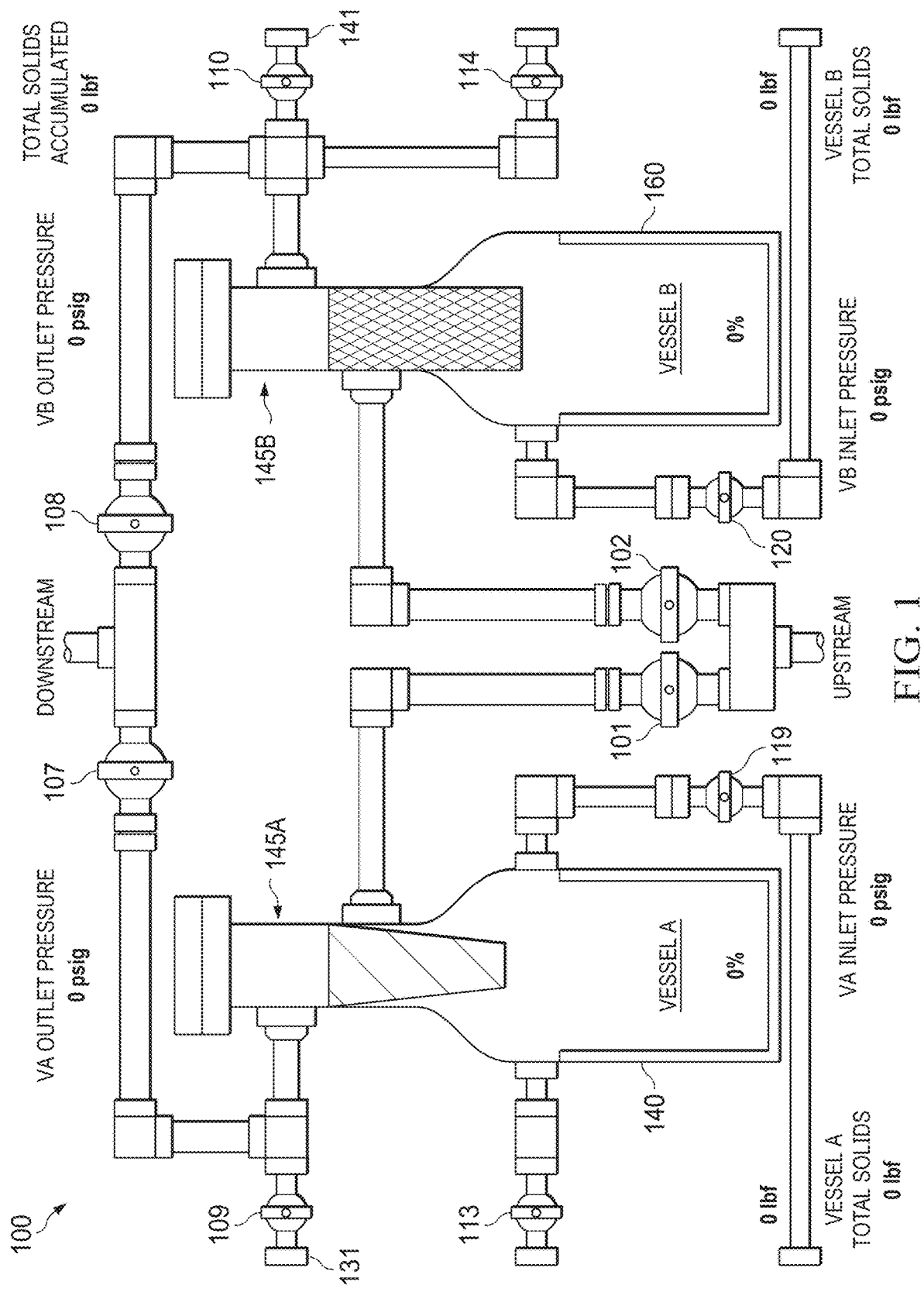
FIG. 1 is a schematic view of a sand management system having a set of automatic valves.

The illustrated figures are only exemplary and are not intended to assert or imply any limitation with regard to the environment, architecture, design, or process in which different embodiments may be implemented.

DETAILED DESCRIPTION

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

The present disclosure relates to systems and methods to control a sand management system. As referred to herein, a sand management system includes any system configured to filter or remove solids from fluids that flow into, through, and/or out of a wellbore of a hydrocarbon well (collectively "wellbore fluids"). In some embodiments, the sand management system includes two vessels that are utilized to filter sand and other solid materials from the fluids. In one or more of such embodiments, a first vessel of the two vessels include a cyclone or cyclone-shaped insert configured to initiate a cyclone effect to separate solids from fluids. In one or more of such embodiments, a second vessel of the two vessels includes a filter element (e.g., a screen insert) configured to separate solids from fluids. In one or more of such embodiments, both vessels include cyclone or cyclone-shaped inserts of identical or different sizes. In one or more of such embodiments, both vessels include filter elements having identical or different mesh sizes. In some embodiments, the sand management system is configured to flow fluids through the first vessel to separate heavier or larger solids from the fluids, then flow the fluids through the second vessel to separate finer or smaller solids from the fluids.

In some embodiments, the sand management system is configured to monitor fluids flowing through the vessels and the accumulation of solids (e.g., weight, volume, and other quantifiable measurements of the solids) in each of the vessels. The sand management system is configured to switch between different vessels to prevent one vessel from accumulating more than a threshold amount of solids. In that regard, the sand management system includes sensors such as pressure sensors, load sensors, flow meters, level sensors, densimeters, viscometers, accelerometers, microphones, acoustic sensors, and other types of sensors that are configured to dynamically monitor the accumulation of solids in different vessels, the weight and/or volume of solids in each vessel, the differential pressure across the inlet and outlet of a vessel and between different vessels, and other measurements associated with solids and fluids in different vessels of the sand management system. In one or more of such embodiments, the sensors are configured to determine when to switch different vessels, when to divert fluid flow to different vessels, when to flush vessels, how much solid will reach the surface, and when to notify an operator regarding the condition of the vessels and the sand management system.

The sand management system includes a set of actuating valves configured to automatically shift from open to closed positions and from closed to open positions to permit or restrict fluid flow through each vessel, thereby restricting fluid flow into certain vessels that have accumulated more than the threshold amount of solid particles, and permitting fluid flow through other vessels that have not accumulated more than the threshold amount of solid particles. In some embodiments, the set of actuating valves are also configured to automatically shift from open to closed positions and from closed to open positions to equalize pressure between different vessels, increase or decrease pressure differential across certain vessels, flush out certain vessels, and perform other operations to manage and separate solid particles, and to control fluid flow through the vessels.

In some embodiments, the error range for the pressure sensors of the sand management system are adjustable based on the pressure level, the temperature, or the health of the sensor. In some embodiments, the time for determining stabilization are adjustable based on the material in the vessel (sand versus a heavy crude or scale), based on the pressure level, the temperature, the fill level, and the error range of the sensors. In some embodiments, and depending on valve type, the valves are set to open or close quickly or slowly, set to be partially open or open with changing rotational speed profile (e.g. opening slowly at first, and then more quickly) to regulate pressure and change in pressure. In some embodiments, the sand management system is adjustable based upon sensor readings, such as: the pressures at the vent or the outlet of the vessel, the flow rate passing through the vessel, the pressure profile across the vessels, or the amount of solids fill. In some embodiments, the sand management system determines equilibration based on a moving average of the two outlet pressures being within a certain error range of each other for a certain amount of time, or population comparison methods (such as ANOVA, student t-test, etc.) and achieving certain statistical threshold, a classification or other machine-learning based methodology, or another statistical process.

An autodiversion sand system is a system that is configured to perform autodiversion of a sand management system. The autodiversion sand system has a storage medium and processors configured to determine a first pressure differential across a first vessel of the sand management system, in response to a determination that the first pressure differential is above a first pressure threshold, request actuation of a first set of valves to flow fluid from the first vessel to a second vessel of the sand management system, and request the first vessel to be flushed. In some embodiments, the autodiversion sand system (or the processors of the autodiversion system) is further configured to determine a second pressure differential across the second vessel, in response to a determination that the second pressure differential is above a second pressure threshold, request actuation of a second set of valves to flow the fluid from the second vessel to the first vessel, and request the second vessel to be flushed. In some embodiments, the autodiversion sand system is a component (e.g., hardware, software, and/or firmware component) of the sand management system described herein. In some embodiments, the autodiversion sand system controls or includes fluid vessels and valves of the sand management system. Additional descriptions of sand management systems, autodiversion sand systems, and operations performed to operate sand management systems and perform autodiversion of sand management systems are provided in the paragraphs below and are illustrated in at least FIGS. 1-10.

FIG. 1 is a schematic view of a sand management system 100 having a set of automatic valves. In the embodiment of FIG. 1, sand management system 100 includes a first vessel 140 having a first insert 145A comprising a cyclone and configured to separate heavier or larger solids, and a second vessel 160 comprising a second insert 145B having a filter material that is configured to separate finer or smaller solids. Sand management system 100 also includes manual and/or actuating valves 101, 102, 107, 108, 109, 110, 113, 114, 119, and 120, which are configured to automatically shift from open to closed positions and from closed to open positions. In the embodiment of FIG. 1, actuating valves 101, 102, 107, 108, 109, 110, 113, 114, 119, and 120 are initially in the closed position to prevent fluid flow through first vessel 140 and second vessel 160. In the embodiment of FIG. 1, sand management system 100 also includes choke valves 131 and 141 that are configured to control the rate of fluid pressure equalization. In some embodiments, sand management system 100 also includes manually controlled valves that are manually shifted from open to closed positions and from closed to open positions. In one or more of such embodiments, the manually-shifted valves and actuating valves 101, 102, 107, 108, 109, 110, 113, 114, 119, and 120 are shifted sequentially or simultaneously to control fluid flow through different vessels of the sand management system, rate of fluid pressure equalization, and autonomously or manually perform other operations described herein. The shifting of valves 101 and 107 to open positions permits upstream fluids to flow along a fluid flow path through first vessel 140 where solid particles are filtered by the cyclone, and along a second fluid flow path out of first vessel 140 and downstream.

Although FIG. 1 illustrates two vessels 140 and 160, in some embodiments, sand management system 100 has three or more vessels, and a set of actuating valves configured to shift from open to closed positions and from closed to open positions to perform operations described herein to redirect fluid flow with respect to the three or more vessels, equilibrate pressure among two or more of the vessels, and to flush the different vessels. Similarly, although FIG. 1 illustrates a set of actuating valves, in some embodiments, sand management system 100 includes a different set of valves positioned at different positions along the fluid flow paths of sand management system 100.

Figure 2:
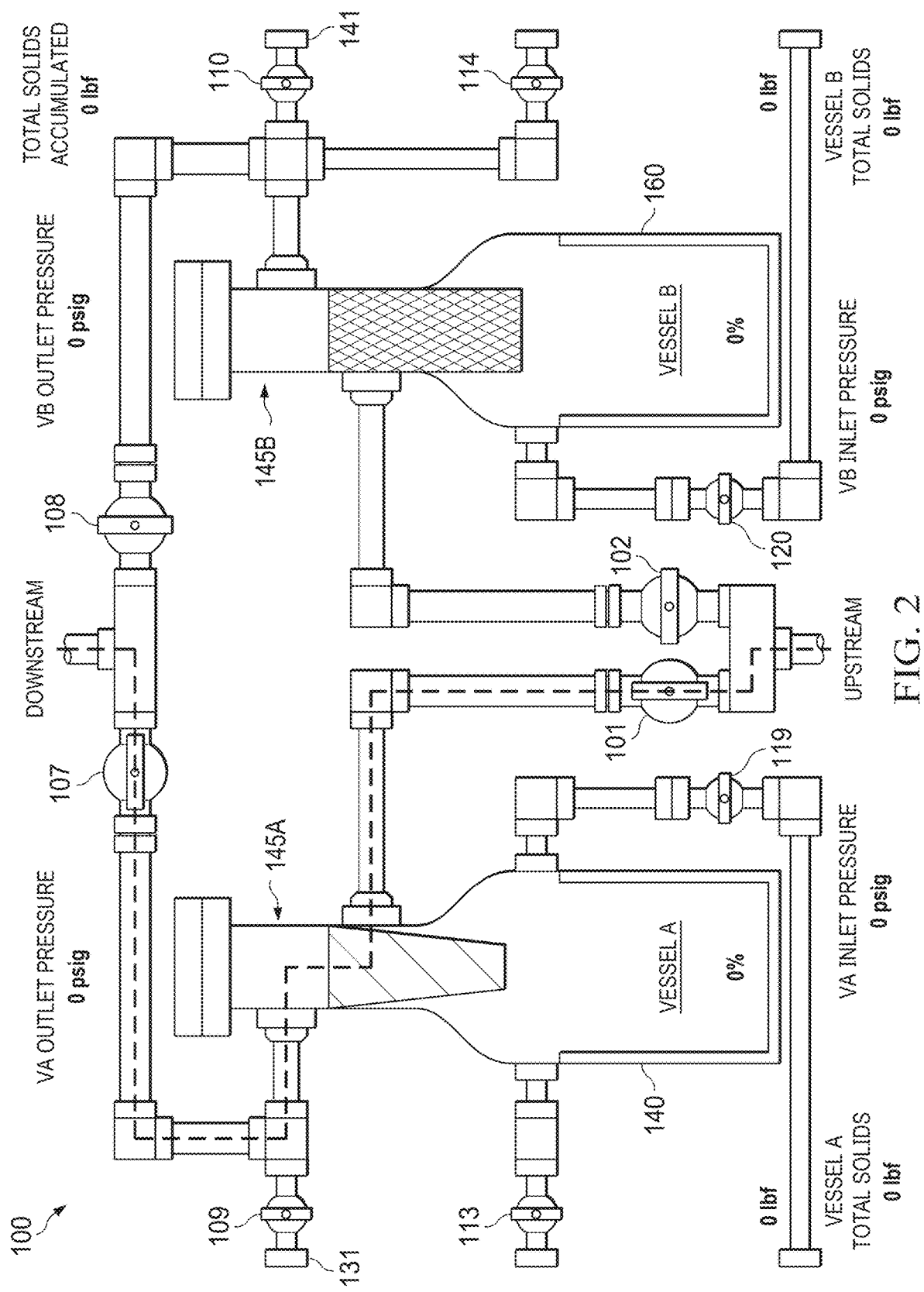
FIG. 2 is a schematic view of the sand management system of FIG. 1 after some of the valves have shifted to open or closed positions to permit fluid flow through the first vessel and restrict fluid flow through the second vessel.

FIG. 2 is a schematic view of sand management system 100 of FIG. 1 after some of the valves have shifted to open or closed positions to permit fluid flow through first vessel 140, and restrict fluid flow through second vessel 160. More particularly, in the embodiment of FIG. 2, valves 101 and 107 have shifted from closed positions illustrated in FIG. 1 to open positions, while the other valves remain in the closed positions. Sand management system 100 periodically or continuously monitors (e.g., via one or more sensors of sand management system 100) the accumulation of solid particles in first vessel 140. In some embodiments, sand management system 100 monitors the weight of solid particles in first vessel 140 to determine if the total weight of the solid particles is above a threshold weight. In some embodiments, sand management system 100 monitors the volume of solid particles in first vessel 140 to determine if the total volume of solid particles is above a threshold volume. In the embodiments, sand management system 100 determines if a pressure differential between an inlet and outlet of first vessel 140 is above a threshold level. In some embodiments, sand management system 100, in response to a determination that more than a threshold amount of solids have accumulated in first vessel 140, diverts flow from first vessel 140 to second vessel 160 (e.g., to initiate a flush operation). In some embodiments, sand management system 100 dynamically controls one or more actuating valves to divert flow from first vessel 140. In some embodiments, sand management system 100 queries an operator for instructions regarding whether to divert flow from first vessel 140.

Figure 3:
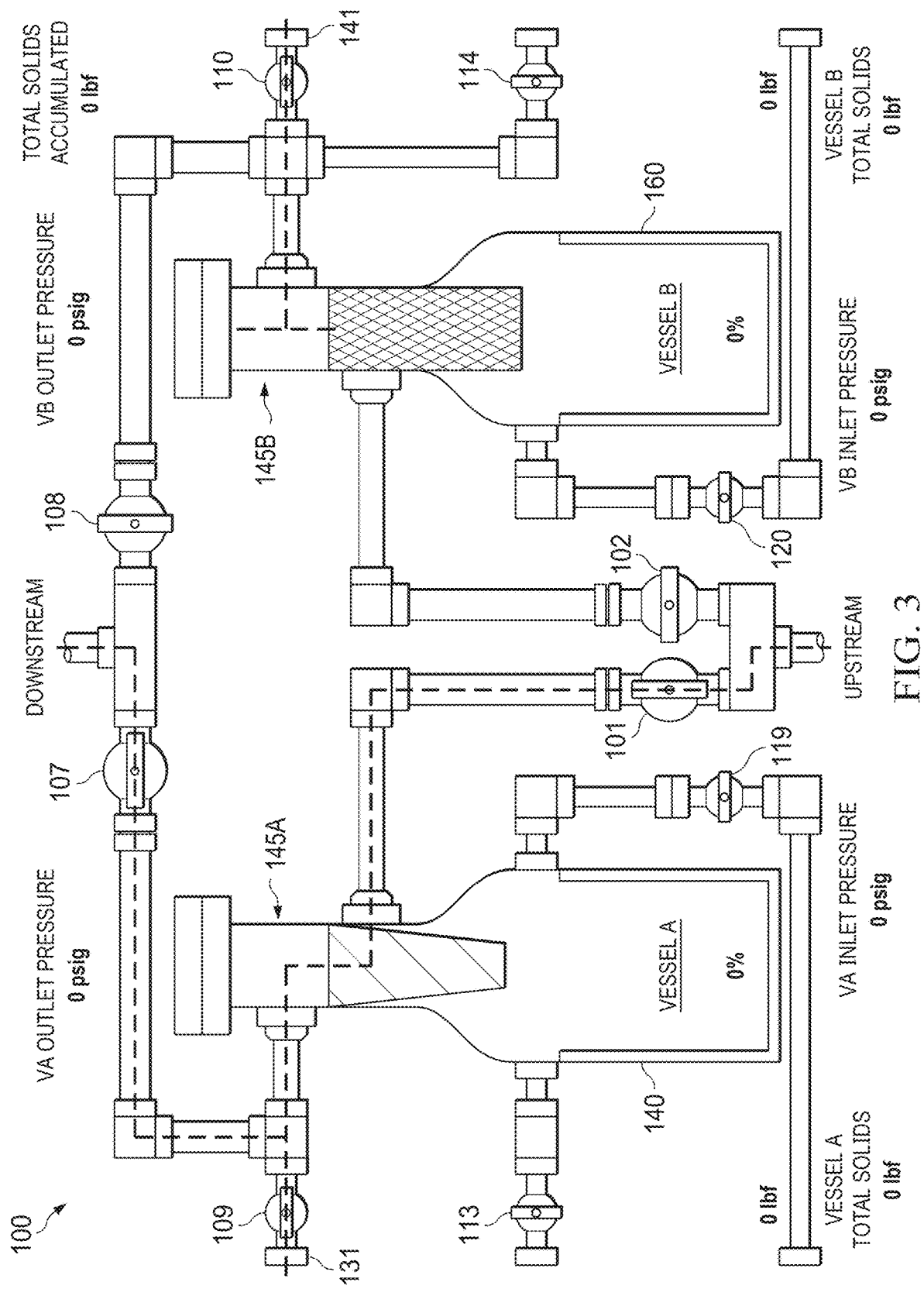
FIG. 3 is a schematic view of the sand management system of FIG. 2 after some of the valves have shifted to open or closed positions to equalize pressure between the first vessel and the second vessel.

FIG. 3 is a schematic view of sand management system 100 of FIG. 2 after some of the valves have shifted to open or closed positions to equalize pressure between first vessel 140 and second vessel 160. In the embodiment of FIG. 3, valves 109 and 110 are shifted from the closed position illustrated in FIG. 2 to an open position while the other valves remain in the positions illustrated in FIG. 2 to equalize the pressure between first vessel 140 and second vessel 160. In some embodiments, sand management system 100 controls the rate at which valves 109 and 110 are shifted to control the rate at which pressure differential between first vessel 140 and second vessel 160 are adjusted to prevent damage to sand management system 100.

Figure 4:
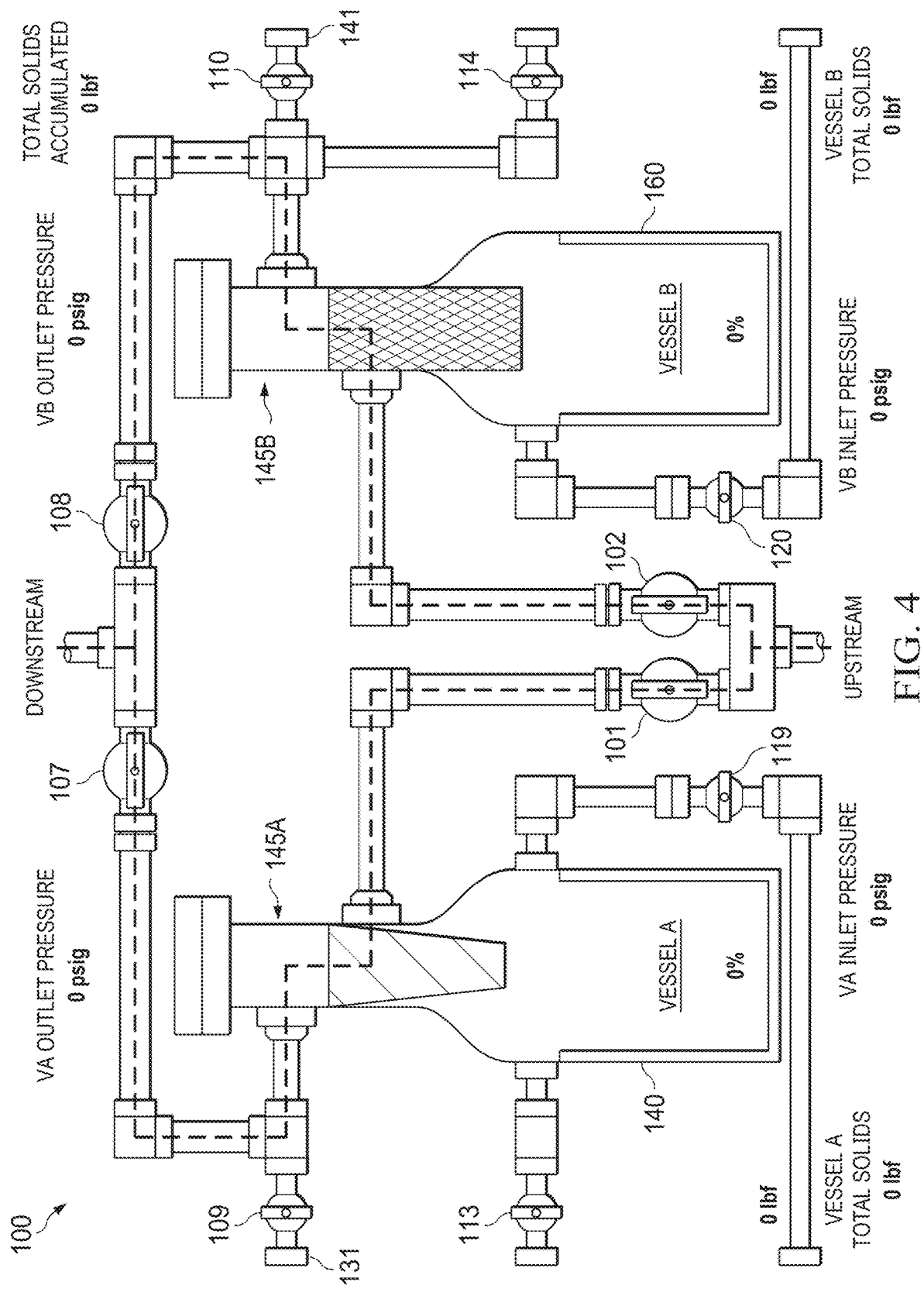
FIG. 4 is a schematic view of the sand management system of FIG. 3 at a moment in time after some of the valves have shifted to open or closed positions to permit flow through both the first vessel and the second vessel.

FIG. 4 is a schematic view of sand management system 100 of FIG. 3 at a moment in time after some of the valves have shifted to open or closed positions to permit flow through both the first vessel 140 and the second vessel 160. More particularly, valves 109 and 110 are shifted from the open positions shown in FIG. 3 to closed positions, and valves 108 and 102 are shifted from the closed positions shown in FIG. 3 to open positions. In some embodiments, valve 108 is first shifted from the closed position to the open position, followed by valve 102. In some embodiments, valve 101 is closed followed by valve 107 to stop flow through first vessel 140. In some embodiments, after flow through first vessel 140 is restricted, sand management system 100 determines (either dynamically or queries the operator to determine) whether to vent first vessel 140.

Figure 5:
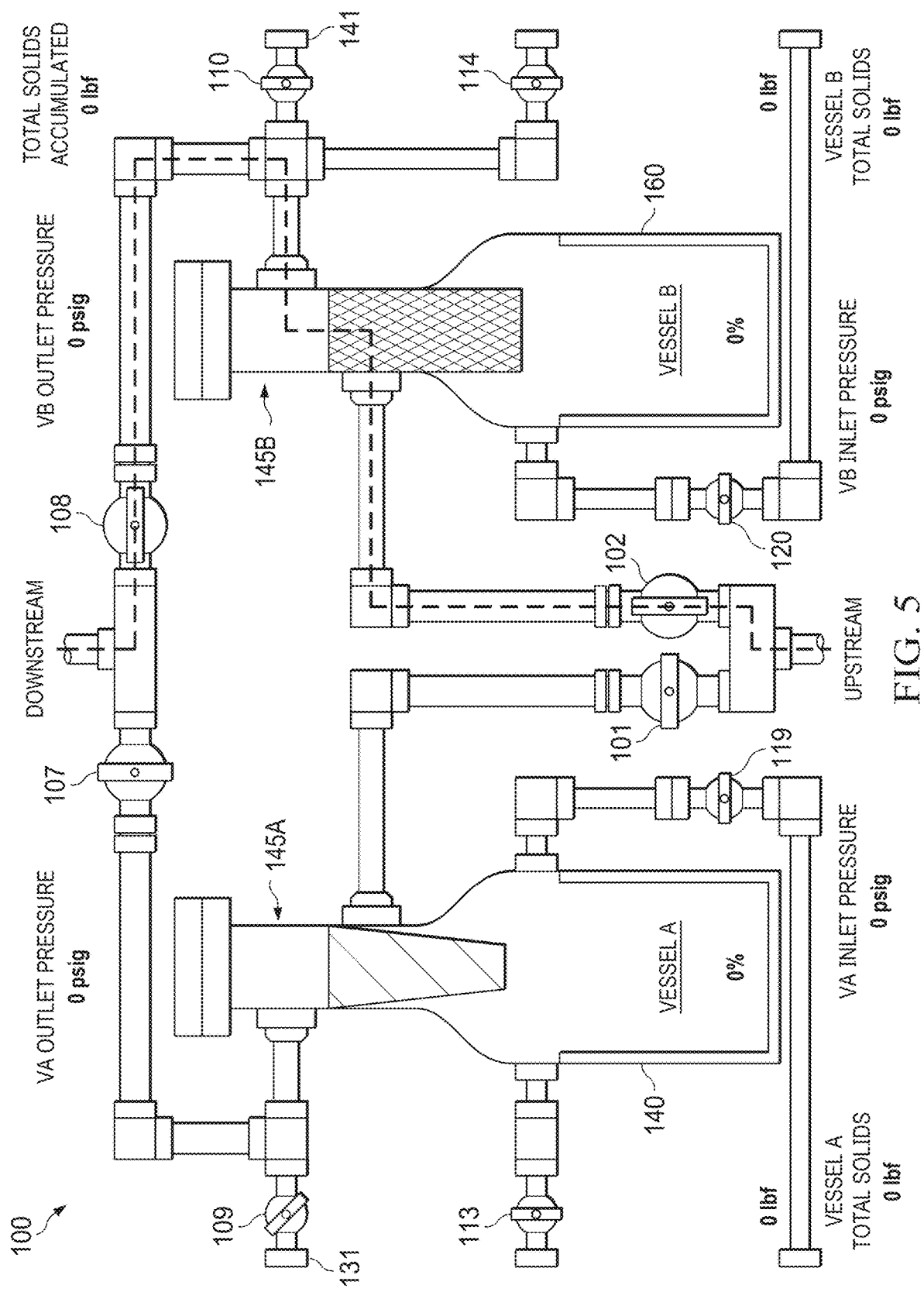
FIG. 5 is a schematic view of the sand management system of FIG. 4 after some of the valves have shifted to open or closed positions to permit pressure to vent from the first vessel while permitting fluid flow through the second vessel.

FIG. 5 is a schematic view of sand management system 100 of FIG. 4 after some of the valves have shifted to open or closed positions to permit pressure to vent from the first vessel while permitting fluid flow through the second vessel. In the embodiment of FIG. 5, valves 101 and 107 have shifted from the open positions illustrated in FIG. 4 to closed positions to restrict flow through first vessel 140. In the embodiment of FIG. 5, valves 109 and 110 are shifting from the closed position illustrated in FIG. 4 to open positions to vent first vessel 140. In some embodiments, where a choke valve (e.g., choke valve 131 of FIG. 1) is fluidly coupled to valve 109, sand management system 100 controls valves 109 and 110, and the choke valve to flow pressure out of first vessel 140 and through controls valves 109 and 110, and the choke valve. In some embodiments, sand management system 100 dynamically shifts valve 110 or queries the operator to shift valve 110 from the closed position illustrated in FIG. 4 towards an open position (not shown) while maintaining valve 109 in the closed position to vent second vessel 160.

Figure 6:
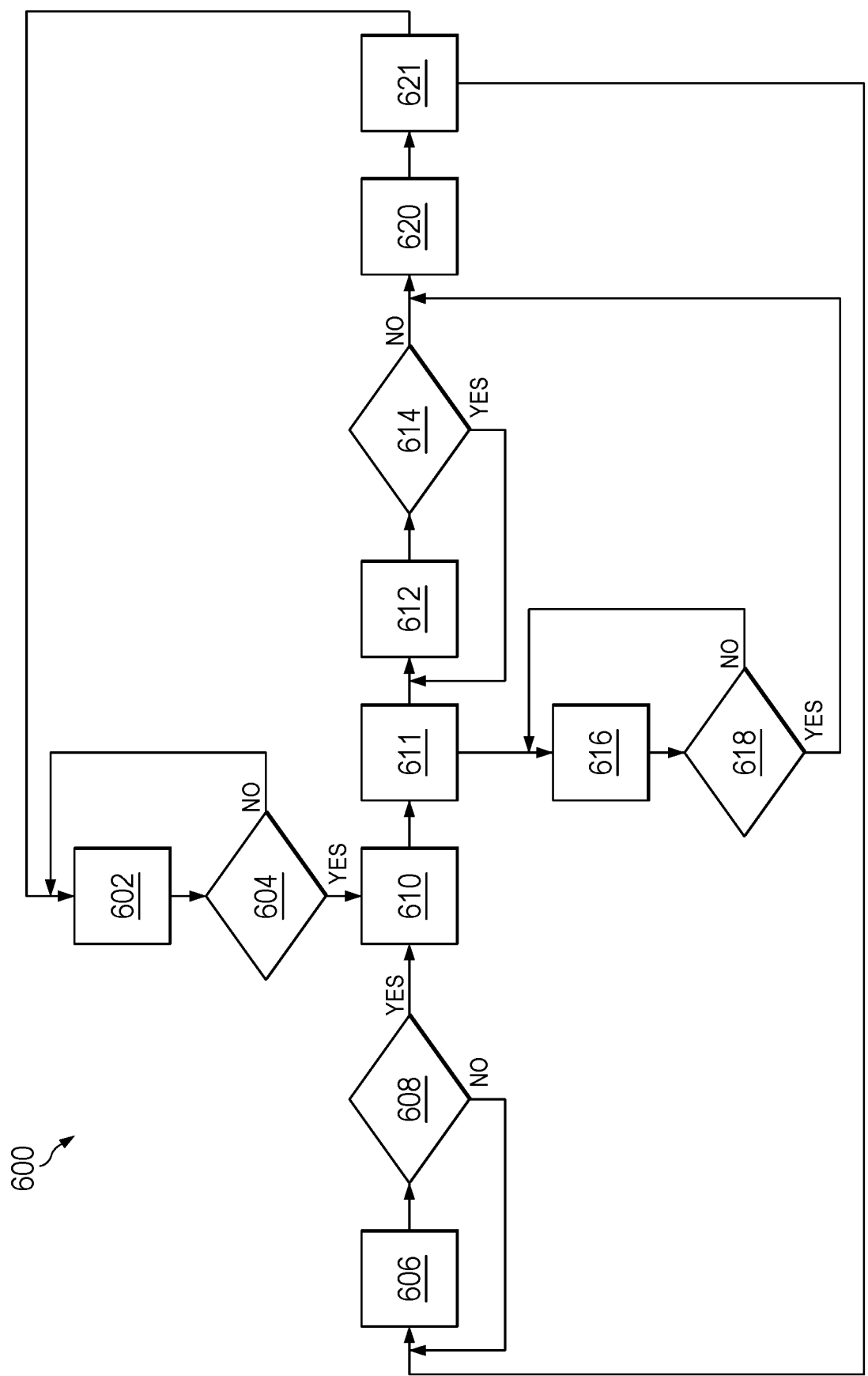
FIG. 6 illustrates a process to perform autodiversion of a sand management system similar to the sand management system of FIG. 1.

FIG. 6 illustrates a process 600 to perform autodiversion of a sand management system similar to the sand management system 100 of FIG. 1. Although the operations in process 600 are shown in a particular sequence, certain operations may be performed in different sequences or at the same time where feasible.

At block 602, a sand management system, such as sand management system 100 of FIG. 1 reads the differential pressure across a vessel of the sand management system 100, such as first vessel 140 of FIG. 1. At block 604, a determination of whether the pressure differential across the 10) first vessel is above a threshold. Process 600 returns to block 602 in response to a determination that the pressure differential is not above the threshold. Alternatively, process 600 proceeds to block 610 in response to a determination that the pressure differential is above the threshold. Process 600 also concurrently starts or sequentially (before or after block 602) proceeds to block 606, where the sand management system determines a weight of the first vessel (the weight of the solid particles in the first vessel or based on the percent fill of the first vessel). Process 600 then proceeds to block 608. At block 608, a determination of whether the weight of the first vessel (or the weight of the solid particles in the first vessel) is above a threshold weight is determined. Process 600 returns to block 606 in response to a determination that the weight is not above the threshold. Alternatively, process 600 proceeds to block 610 in response to a determination that the weight is above the threshold. At block 610, the sand management system shifts actuation valves to re-direct fluid flow through a second vessel, such as vessel 160 of FIG. 1. In some embodiments, the sand management system also performs operations described herein and illustrated in at least FIGS. 3-5 to equalize pressure between the two vessels. Process 600 then proceeds to block 611 and the first vessel is flushed to remove solid particles from the first vessel. The process 600 then proceeds to block 612 and/or 616.

At block 612, the sand management system reads the differential pressure across the second vessel. At block 614 a determination of whether the pressure differential across the second vessel is above a threshold is made. Process 600 returns to block 612 in response to a determination that the pressure differential is not above the threshold. Alternatively, process 600 proceeds to block 620 in response to a determination that the pressure differential is above the threshold. Process 600 also concurrently starts or sequentially (before or after block 612) proceeds to block 616, where the sand management system determines a weight of the second vessel (or the weight of the solid particles in the second vessel). Process 600 then proceeds to block 618. At block 618, a determination of whether the weight of the second vessel (the percent fill of the first vessel or the weight of the solid particles in the second vessel) is above a threshold weight is made. Process 600 returns to block 616 in response to a determination that the weight is not above the threshold. Alternatively, process 600 proceeds to block 620 in response to a determination that the weight is above the threshold. At block 620, the sand management system shifts actuation valves to re-direct fluid flow through the first vessel. In some embodiments, the sand management system also performs operations described herein and illustrated in at least FIGS. 3-5 to equalize pressure between the two vessels. In some embodiments, where the sand management system has more than two vessels, the sand management system shifts the actuation valves to re-direct fluid flow back to a third vessel, and operations similar to operations performed at blocks 602, 604, 606, and 608 are performed with respect to the third vessel. Process 600 then proceeds to block 621 and the second vessel is flushed to remove solid particles from the second vessel. The process then returns to block 602 and/or 606, and the foregoing operations are repeated.

Figure 7:
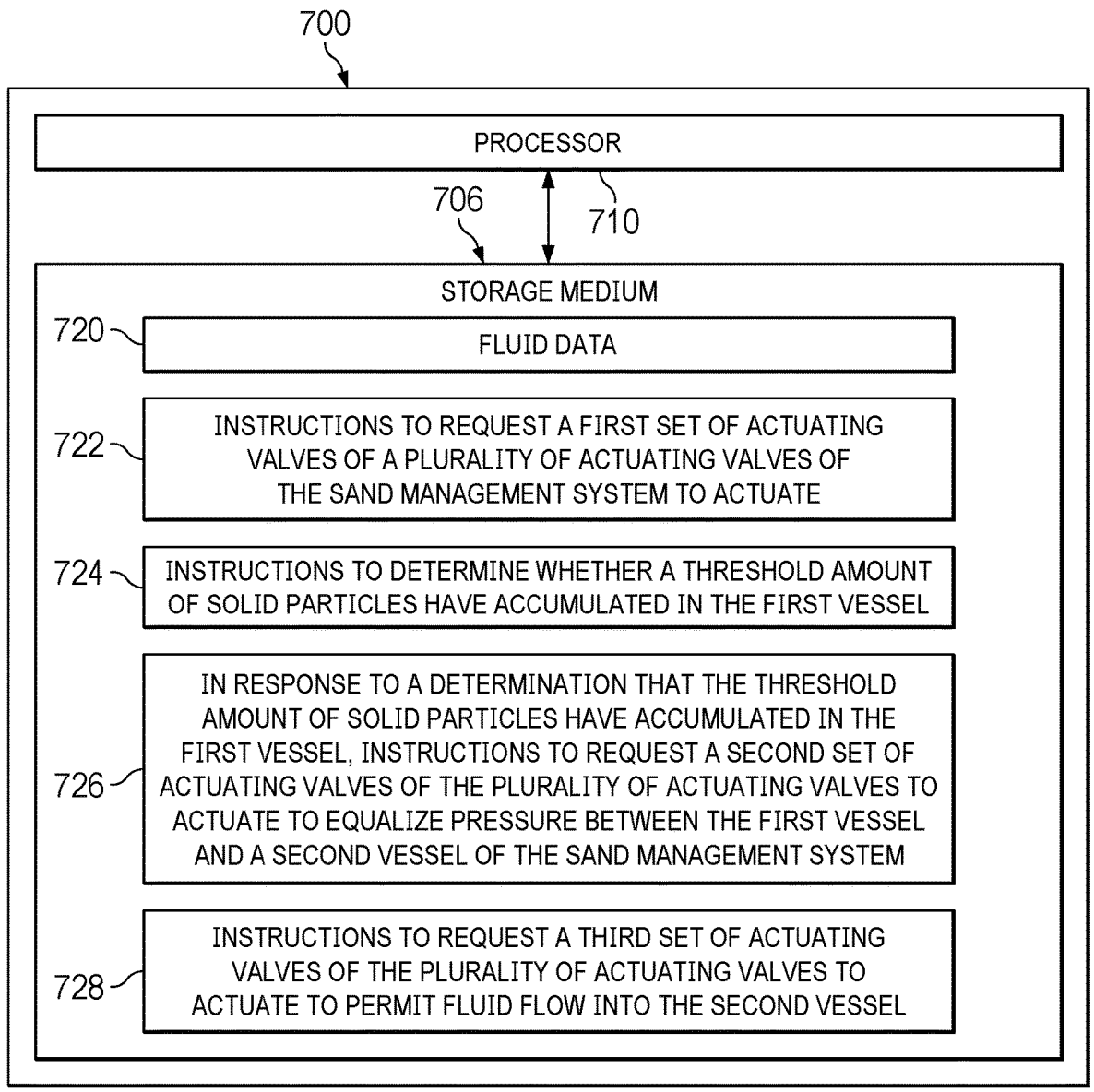
FIG. 7 is a block diagram of a sand management system described herein.

FIG. 7 is a block diagram 700 of a sand management system described herein. Sand management system 700 includes a storage medium 706 and a processor 710. The storage medium 706 may be formed from data storage components such as, but not limited to, read-only memory (ROM), random access memory (RAM), flash memory, magnetic hard drives, solid state hard drives, CD-ROM drives, DVD drives, floppy disk drives, as well as other types of data storage components and devices. In some embodiments, the storage medium 706 includes multiple data storage devices. In further embodiments, the multiple data storage devices may be physically stored at different locations. In one of such embodiments, the data storage devices are components of a server station, such as a cloud server.

Data indicative of fluids, material properties of the fluids, and material properties of solid and other types of particles in the fluids (collectively "fluid data") is stored at a first location 720 of storage medium 706. Further, instructions to request a first set of actuating valves of a plurality of actuating valves of the sand management system to actuate are stored at a second location 722 of storage medium 706. Further, instructions to determine whether a threshold amount of solid particles have accumulated in the first vessel are stored at a third location 724 of storage medium 706. Further, in response to a determination that the threshold amount of solid particles have accumulated in the first vessel, instructions to request a second set of actuating valves of the plurality of actuating valves to actuate to equalize pressure between the first vessel and a second vessel of the sand management system are stored at a fourth location 726 of storage medium 706. Further, instructions to request a third set of actuating valves of the plurality of actuating valves to actuate to permit fluid flow into the second vessel are stored at a fifth location 728 of storage medium 706. Further, instructions to perform additional operations described herein are stored at other locations of storage medium 706.

Figure 8:
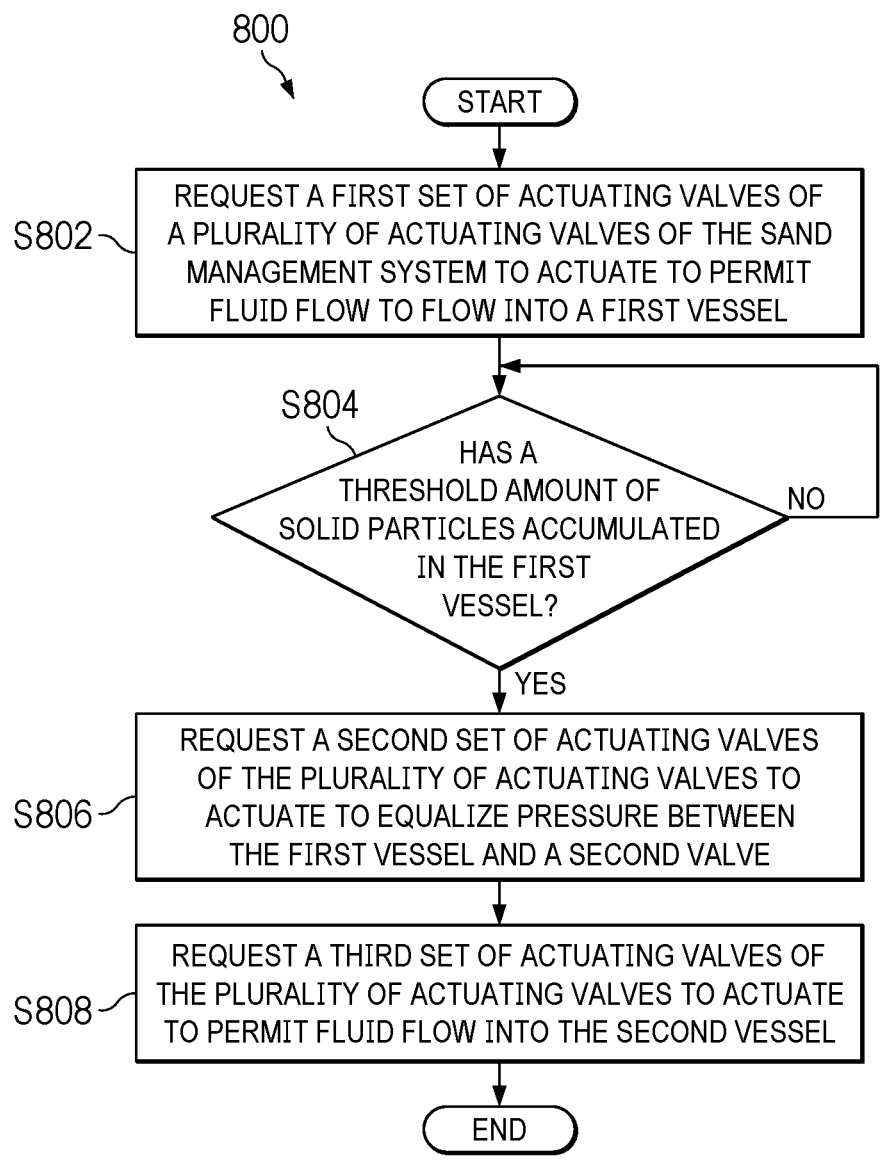
FIG. 8 is a flow chart of a process to operate a sand management system.

FIG. 8 is a flow chart of a process 800 to operate a sand management system. Although the operations in process 800 are shown in a particular sequence, certain operations may be performed in different sequences or at the same time where feasible.

At block S802, a sand management system (or a processor of the sand management system) actuates (or requests actuation of) a first set of actuating valves of a plurality of actuating valves of the sand management system to permit fluid flow to flow into a first vessel. In some embodiments, the sand management system also actuates the first set of actuating valves to restrict fluid flow into the second vessel. At block S804, the sand management system determines whether a threshold amount of solid particles have accumulated in the first vessel is made. In some embodiments, the sand management system determines the weight of the solid particles in the first vessel, and determines whether the threshold amount of solid particles have accumulated in the first vessel based on whether the weight of the solid particles in the first vessel is greater than a threshold weight. In some embodiments, the sand management system determines a volume of the solid particles in the first vessel, and determines whether the threshold amount of solid particles have accumulated in the first vessel based on whether the volume of the solid particles in the first vessel is greater than a threshold volume. Process 800 returns to block S802 in response to a determination that the threshold amount of solid particles have not accumulated in the first vessel. In some embodiments, process 800 periodically proceeds from block S802 to S804. At block S804, and in response to a determination that the threshold amount of solid particles have accumulated in the first vessel, process 800 proceeds to block S806.

At block S806, the sand management system actuates (or requests actuation of) a second set of actuating valves of the plurality of actuating valves to equalize pressure between the first vessel and a second valve. At block S808, the sand management system actuates (or requests actuation of) a third set of actuating valves of the plurality of actuating valves to permit fluid flow into the second vessel. In some embodiments, the sand management system also actuates the third set of actuating valves to restrict fluid flow into the first vessel. In some embodiments, the sand management system, after actuating the third set of valves, periodically or continuously monitors the second vessel to determine whether a threshold amount of solid particles have accumulated in the second vessel. In one or more of such embodiments, the sand management system, in response to a determination that the threshold amount of solid particles have accumulated in the second vessel, actuates the second set of actuating valves (or a different set of valves) to equalize pressure between the first vessel and a second vessel. The sand management system then actuates the first set of valves (or a different set of valves) to permit fluid flow to flow into the first vessel and restrict fluid flow into the second vessel. In one or more of such embodiments, process 800 dynamically repeats to control fluid flow and the amount of solid particles accumulated in the first vessel and the second vessel.

Figure 9:
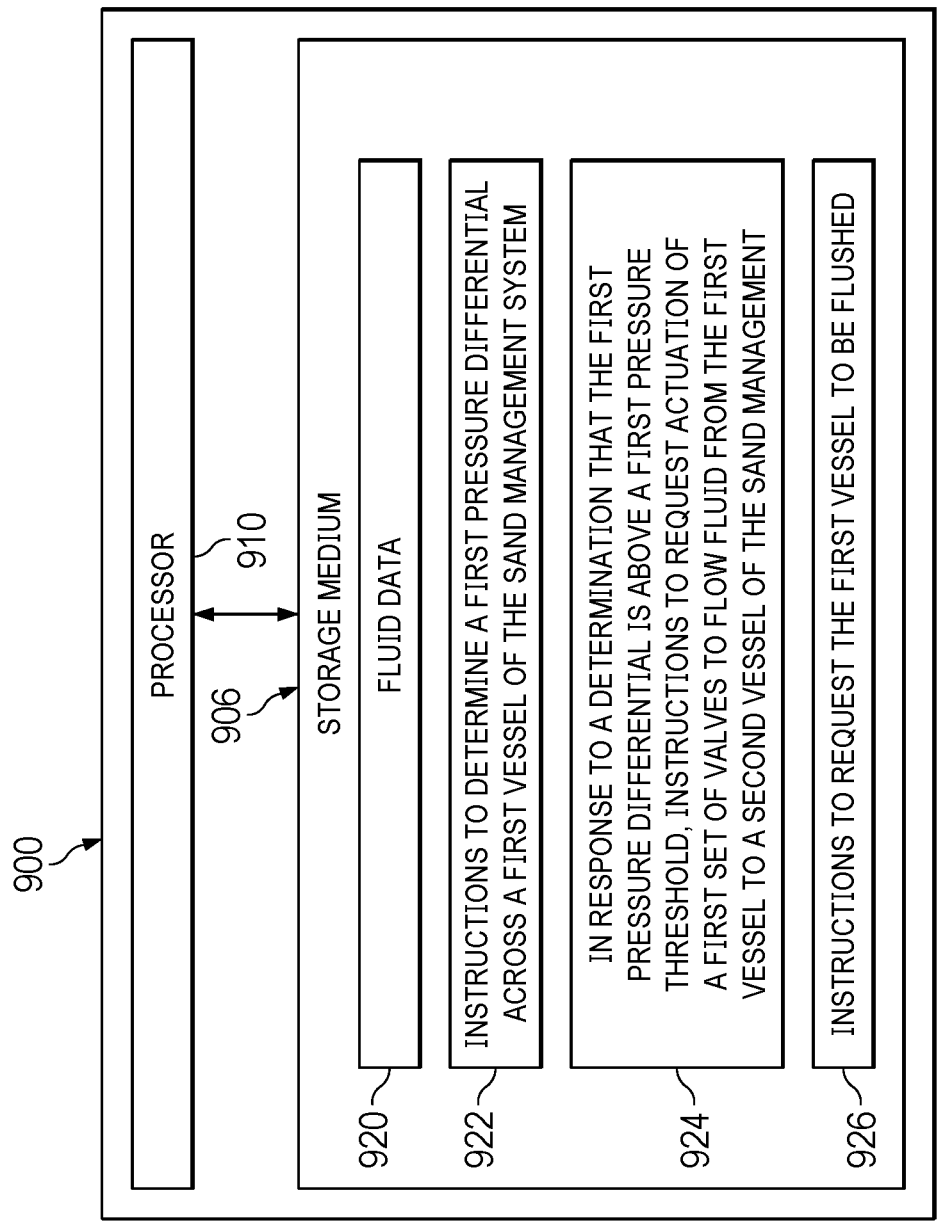
FIG. 9 is a block diagram of an autodiversion sand system described herein.

FIG. 9 is a block diagram 900 of an autodiversion sand system described herein. Autodiversion sand system 900 includes a storage medium 906 and a processor 910. The storage medium 906 may be formed from data storage components such as, but not limited to, ROM, RAM, flash memory, magnetic hard drives, solid state hard drives, CD-ROM drives, DVD drives, floppy disk drives, as well as other types of data storage components and devices. In some embodiments, the storage medium 906 includes multiple data storage devices. In further embodiments, the multiple data storage devices may be physically stored at different locations. In 20) one of such embodiments, the data storage devices are components of a server station, such as a cloud server.

Fluid data is stored at a first location 920 of storage medium 906. Further, instructions to determine a first pressure differential across a first vessel of the sand management system are stored at a second location 922 of storage medium 706. Further, in response to a determination that the first pressure differential is above a first pressure threshold, instructions to request actuation of a first set of valves to flow fluid from the first vessel to a second vessel of the sand management system are stored at a third location 924 of storage medium 906. Further, instructions to request the first vessel to be flushed are stored at a fourth location 926 of storage medium 906. Further, instructions to perform additional operations described herein are stored at other locations of storage medium 906.

Figure 10:
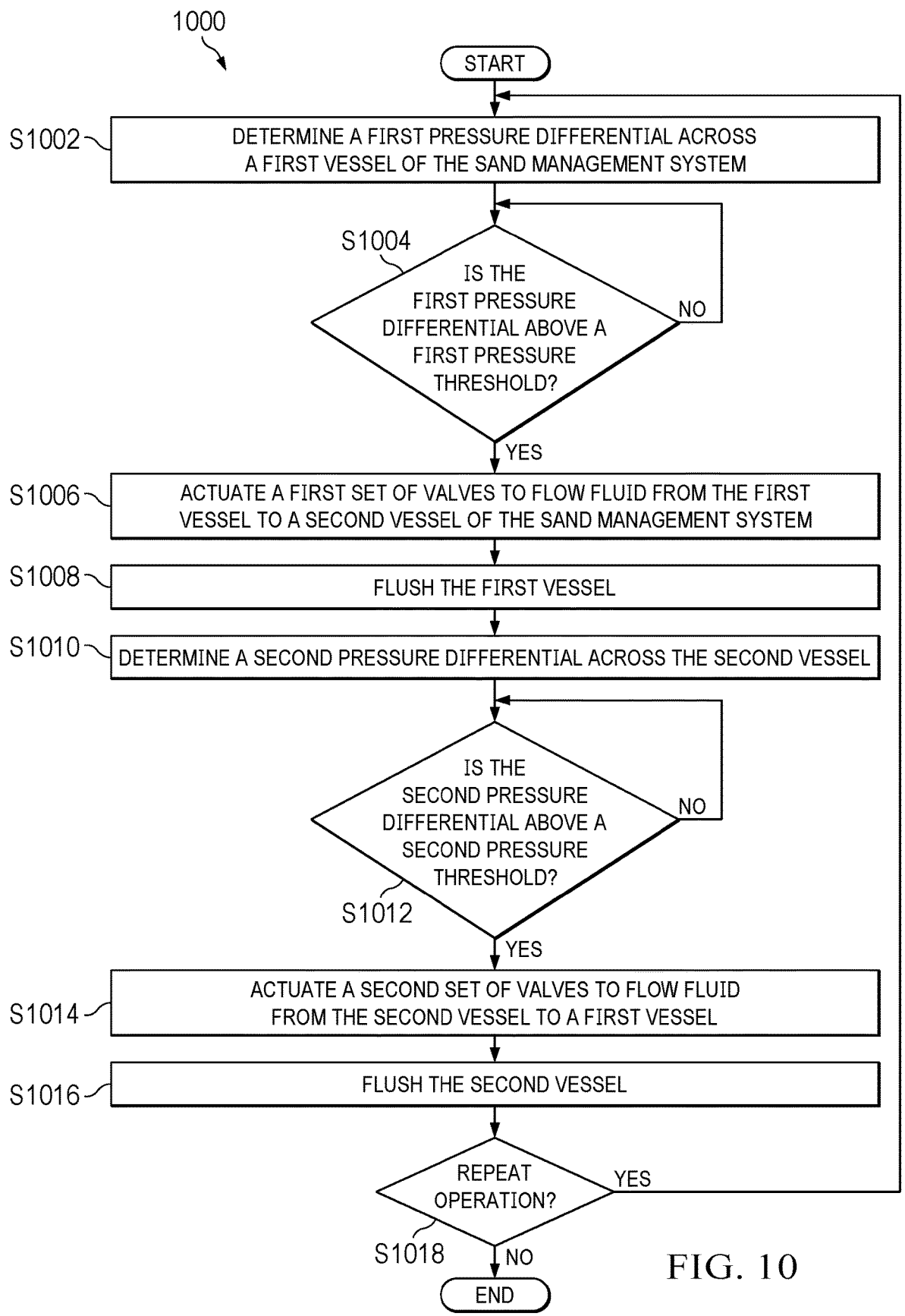
FIG. 10 is a flow chart of a process to perform autodiversion of a sand system.

FIG. 10 is a flow chart of a process 1000 to operate a sand management system. Although the operations in process 1000 are shown in a particular sequence, certain operations may be performed in different sequences or at the same time where feasible.

At block S1002, the autodiversion sand system (or a processor of the autodiversion sand system) determines a first pressure differential across a first vessel of a sand management system. At block S1004, the autodiversion sand system determines if the first pressure differential is above a first pressure threshold. In some embodiments, the autodiversion sand system obtains via one or more sensors the pressure at the inlet of the first vessel and at the outlet of the first vessel, and determines the first pressure differential across the inlet and outlet of the first vessel, where the first pressure differential is the pressure differential across the inlet and the outlet of the first vessel. In some embodiments, process 1000 returns to block S1004 in response to a determination that the first pressure differential is not above the first pressure threshold, and the autodiversion sand system dynamically monitors the pressure differential to determine whether the first pressure differential is eventually above the first pressure threshold. Alternatively, process 1000 proceeds to block S1006 in response to a determination that the first pressure is above the first pressure threshold.

At block S1006, the autodiversion sand system (or a processor of the autodiversion sand system) actuates (or requests actuation of) a first set of valves of the sand management system to flow fluid from the first vessel to a second vessel of the sand management system. In some embodiments, the autodiversion sand system actuates the first set of valves to flow the fluid from the first vessel to the second vessel in response to a determination that the first weight is above a first weight threshold. In some embodiments, the autodiversion sand system, in response to a determination that the first weight is above the first weight threshold, generates a user notification regarding the weight of the solid particles, and provides the notification to an operator. In one or more of such embodiments, the autodiversion sand system actuates the first set of valves in response to receipt of a user approval to flow the fluid from the first vessel to the second vessel. In one or more of such embodiments, the autodiversion sand system actuates the first set of valves if no user approval is received within a threshold period of time after weight of the first vessel remains above the first weight threshold for the threshold period of time. In some embodiments, the autodiversion sand system determines a fill level of the first vessel. In one or more of such embodiments, the autodiversion sand system, actuates the first set of valves to flow the fluid from the first vessel to the second vessel of the sand management system in response to a determination that the first fill level is above a first threshold fill level (e.g., 50%, 80%, or another threshold fill level). In some embodiments, the autodiversion sand system, in response to the determination that the first pressure differential is above a first pressure threshold, also actuates one or more valves to equalize pressures between the first vessel and the second vessel, flow the fluid through both the first vessel and the second vessel, and stopping flow through the first vessel.

At block S1008 the autodiversion sand system (or a processor of the autodiversion sand system) flushes the first vessel (or requests the first vessel to be flushed). In some embodiments, the autodiversion sand system depressurizes the first vessel, opens a solids outlet and a flush inlet of the first vessel, flushes out solids stored in the first vessel, and closes the solids outlet and flush inlet of the first vessel after the solids are flushed out. In some embodiments, process 1000 ends. In the embodiment of FIG. 10, process 1000 proceeds from block S1008 to block S1010.

At block S1010, the autodiversion sand system (or a processor of the autodiversion sand system) determines a second pressure differential across the second vessel. At block S1012, the autodiversion sand system determines if the second pressure differential is above a second pressure threshold. In some embodiments, the first pressure differential and the second pressure differential are identical or are within a range of each other. In some embodiments, process 1000 returns to block S1012 in response to a determination that the second pressure differential is not above the second pressure threshold, and the autodiversion sand system dynamically monitors the pressure differential to determine whether the second pressure differential is eventually above the second pressure threshold. Alternatively, process 1000 proceeds to block S1014 in response to a determination that the second pressure is above the second pressure threshold.

At block S1014, the autodiversion sand system (or a processor of the autodiversion sand system) actuates (or requests actuation of) a second set of valves of the sand management system to flow fluid from the second vessel back to the first vessel. In some embodiments, the autodiversion sand system actuates the second set of valves to flow the fluid from the second vessel to the first vessel in response to a determination that the second weight is above a second weight threshold. In some embodiments, the autodiversion sand system determines a fill level of the second vessel. In one or more of such embodiments, the autodiversion sand system actuates the second set of valves to flow the fluid from the second vessel to the first vessel of the sand management system in response to a determination that the second fill level is above a second threshold fill level (e.g., 50%, 80%, or another threshold fill level).

At block S1016 the autodiversion sand system (or a processor of the autodiversion sand system) flushes the second vessel (or requests the second vessel to be flushed). In some embodiments, the autodiversion sand system depressurizes the second vessel, opens a solids outlet and a flush inlet of the second vessel, flushes out solids stored in the second vessel, and closes the solids outlet and flush inlet of the second vessel after the solids are flushed out. In some embodiments, process 1000 ends. In the embodiment of FIG. 10, process 1000 proceeds from block S1018 to block S1010. At block S1018, the autodiversion sand system determines whether to repeat the operations of process 1000. Process 1000 then returns to block S1002 in response to a determination to repeat the operations illustrated in process 1000.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure.

Clause 1, a sand management system, comprising: a first vessel having a first insert; a second vessel having a second insert; a fluid flow path that fluidly connects the first vessel to the second vessel; and a plurality of actuating valves each configured to dynamically shift from an open position to a closed position and from the closed position to the open position to regulate fluid flow.

Clause 2, the sand management system of clause 1, further comprising: a plurality of manual valves each configured to shift from an open position to a closed position and from the closed position to the open position to regulate fluid flow.

Clause 3, the sand management system of any of clauses 1 or 2, further comprising: a choke valve fluidly connected to the first vessel and configured to control pressure drop across the first vessel.

Clause 4, the sand management system of clause 3, further comprising: a second choke valve fluidly connected to the second vessel and configured to control pressure drop across the second vessel.

Clause 5, the sand management system of any of clauses 1-4, wherein one or more of the plurality of actuating valves are configured to shift from closed positions to open positions or open positions to closed positions to permit fluid flow into the first vessel while restricting fluid flow into the second vessel.

Clause 6, the sand management system of clause 5, wherein the one or more of the plurality of actuating valves are configured to dynamically shift from closed positions to open positions or open positions to closed positions based on an amount of solid particles in the first vessel.

Clause 7, the sand management system of any of clauses 5 or 6, wherein the one or more of the plurality of actuating valves are configured to shift from closed positions to open positions or open positions to closed positions in response to an operator instruction to shift the one or more actuating valves.

Clause 8, the sand management system of any of clauses 1-7, wherein one or more of the plurality of actuating valves are configured to shift from closed positions to open positions or shift from open positions to closed positions to establish equalization of pressure between the first vessel and the second vessel.

Clause 9 the sand management system of any of clauses 1-8, wherein one or more of the plurality of actuating valves are configured to shift from closed positions to open positions or shift from open positions to flush the first vessel.

Clause 10, the sand management system of any of clauses 1-9, wherein one or more of the plurality of actuating valves are configured to shift from closed positions to open positions or open positions to flush the second vessel.

Clause 11, the sand management system of any of clauses 1-10, wherein the first vessel comprises a cyclone configured to separate solids having dimensions that are greater than or equal to a first threshold size, and wherein the second vessel comprises a filter material configured to separate solids less than a second threshold size, wherein the first threshold size is greater than the second threshold size.

Clause 12, a method to operate a sand management system, comprising: actuating a first set of actuating valves of a plurality of actuating valves of a sand management system to permit fluid flow to flow into a first vessel of the sand management system; determining whether a threshold amount of solid particles have accumulated in the first vessel; in response to a determination to switch, actuating a second set of actuating valves of the plurality of actuating valves to equalize pressure between the first vessel and a second vessel of the sand management system; and actuating a third set of actuating valves of the plurality of actuating valves to permit fluid flow into the second vessel.

Clause 13, the method of clause 12, wherein actuating the first set of actuating valves restricts fluid flow into the second vessel.

Clause 14, the method of clauses 12 or 13, wherein actuating the third set of actuating valves restricts fluid flow into the first vessel.

Clause 15, the method of clause 14, wherein actuating the third set of actuating valves vents the first vessel.

Clause 16, the method of any of clauses 12-15, further comprising determining a weight of the solid particles in the first vessel, wherein determining whether the threshold amount of solid particles have accumulated in the first vessel comprises determining whether the weight of the solid particles in the first vessel is greater than a threshold weight.

Clause 17, thee method of any of clauses 12-16, further comprising determining a volume of the solid particles in the first vessel, wherein determining whether the threshold amount of solid particles have accumulated in the first vessel comprises determining whether the volume of the solid particles in the first vessel is greater than a threshold volume.

Clause 18, a sand management system, comprising: a storage medium; and one or more processors configured to: request a first set of actuating valves of a plurality of actuating valves of the sand management system to actuate to permit fluid flow to flow into a first vessel of the sand management system; determine whether a threshold amount of solid particles have accumulated in the first vessel; in response to a determination that the threshold amount of solid particles have accumulated in the first vessel, request a second set of actuating valves of the plurality of actuating valves to actuate to equalize pressure between the first vessel and a second vessel of the sand management system; and request a third set of actuating valves of the plurality of actuating valves to actuate to permit fluid flow into the second vessel.

Clause 19, the sand management system of clause 18, wherein the one or more processors are configured to: dynamically determine a weight of the solid particles in the first vessel; and dynamically determine whether the threshold amount of solid particles have accumulated in the first vessel based on whether the weight of the solid particles in the first vessel is greater than a threshold weight. Clause 20, the sand management system of clauses 18 or 19, wherein the one or more processors are configured to: dynamically determine a volume of the solid particles in the first vessel; and dynamically determine whether the threshold amount of solid particles have accumulated in the first vessel based on whether the volume of the solid particles in the first vessel is greater than a threshold volume. As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, steps, operations, elements, and/or components, but do not preclude the presence or addition of one or more other features, steps, operations, elements, components, and/or groups thereof. In addition, the steps and components described in the above embodiments and figures are merely illustrative and do not imply that any particular step or component is a requirement of a claimed embodiment.

What is claimed is:

1. A sand management system for removing sand from fluids at a wellsite, the sand management system comprising:
    a first vessel having a first insert that separates solids comprising sand from the fluids;
    a second vessel having a second insert that separates solids from fluids, wherein the second vessel is fluidly connected to the first vessel; and
    a plurality of valves, wherein the plurality of valves comprise a plurality of actuating valves each configured to dynamically shift from an open position to a closed position and from the closed position to the open position to regulate fluid flow throughout the sand management system, and wherein the plurality of actuating valves dynamically shift in response to sensor detected pressure differential, fill level, and/or solid accumulation thresholds within the first vessel and the second vessel, whereby the pressure between the first vessel and the second vessel can be equalized and/or the first vessel, the second vessel, or both can be vented,
    wherein the solids comprise sand, and wherein the first insert and the second insert each comprises a cyclone or cyclone-shaped insert configured to initiate a cyclone effect to separate the solids from the fluids or a filter element insert configured to separate the solids from the fluids.

2. The sand management system of claim 1, wherein the plurality of valves further comprise:
    a plurality of manual valves each configured to shift from an open position to a closed position and from the closed position to the open position to regulate fluid flow.

3. The sand management system of claim 1, wherein the plurality of valves further comprise:

a choke valve fluidly connected to the first vessel and configured to control pressure drop across the first vessel.

4. The sand management system of claim 3, wherein the plurality of valves further comprise:
a second choke valve fluidly connected to the second vessel and configured to control pressure drop across the second vessel.

5. The sand management system of claim 1, wherein one or more of the plurality of actuating valves are configured to shift from closed positions to open positions or open positions to closed positions to permit fluid flow into the first vessel while restricting fluid flow into the second vessel.

6. The sand management system of claim 5, wherein the one or more of the plurality of actuating valves are configured to dynamically shift from closed positions to open positions or open positions to closed positions based on an amount of the solids in the first vessel, and wherein the amount is determined by one or more sensors measuring weight, volume, and/or fill level of the solid particles, and comparison thereof against a threshold.

7. The sand management system of claim 5, wherein the one or more of the plurality of actuating valves are configured to shift from closed positions to open positions or open positions to closed positions in response to an operator instruction to shift the one or more actuating valves.

8. The sand management system of claim 1, wherein one or more of the plurality of actuating valves are configured to shift from closed positions to open positions or shift from open positions to closed positions to establish equalization of pressure between the first vessel and the second vessel, and wherein the shifting is triggered when a monitored pressure differential between the first vessel and the second vessel exceeds a threshold value.

9. The sand management system of claim 1, wherein one or more of the plurality of actuating valves are configured to shift from closed positions to open positions or shift from open positions to flush the first vessel by depressurizing the first vessel, opening a flush inlet and a solids outlet of the first vessel, removing accumulated solids from the first vessel, and resealing the first vessel upon completion of the flush.

10. The sand management system of claim 1, wherein one or more of the plurality of actuating valves are configured to shift from closed positions to open positions or open positions to flush the second vessel.

11. The sand management system of claim 1, wherein the solids include solids having dimensions that are greater than or equal to a first threshold size and solids having dimensions less than a second threshold size, wherein the first insert comprises the cyclone, wherein the cyclone is configured to separate the solids having the dimensions that are greater than or equal to the first threshold size, and wherein the second insert comprises the filter element insert, wherein the filter element insert comprises a filter material configured to separate the solids having the dimensions less than the second threshold size, wherein the first threshold size is greater than the second threshold size.

* * * * *